June 4, 1957 R. H. SIERK ET AL 2,794,384

VENDING MACHINE

Filed June 18, 1954 7 Sheets-Sheet 1

INVENTORS
Raymond H. Sierk and
Raymond W. Sierk

BY Mason, Fenwick & Lawrence
ATTORNEYS

INVENTORS
Raymond H. Sierk and
Raymond W. Sierk

BY Mason, Fenwick & Lawrence
ATTORNEYS

June 4, 1957 R. H. SIERK ET AL 2,794,384

VENDING MACHINE

Filed June 18, 1954 7 Sheets-Sheet 3

INVENTORS
Raymond H. Sierk and
Raymond W. Sierk

BY Mason, Fenwick & Lawrence
ATTORNEYS

INVENTORS
Raymond H. Sierk and
Raymond W. Sierk
BY Mason, Fenwick & Lawrence
ATTORNEYS INVENTORS
Raymond H. Sierk and
Raymond W. Sierk
BY
Mason, Fenwick & Lawrence
ATTORNEYS

VENDING MACHINE

INVENTORS
Raymond H. Sierk and
Raymond W. Sierk
BY Mason, Fenwick & Lawrence
ATTORNEYS June 4, 1957 R. H. SIERK ET AL 2,794,384

VENDING MACHINE

Filed June 18, 1954 7 Sheets-Sheet 7

INVENTORS
Raymond H. Sierk and
Raymond W. Sierk
BY
Mason, Fenwick & Lawrence
ATTORNEYS 2,794,384
Patented June 4, 1957

2,794,384

VENDING MACHINE

Raymond H. Sierk and Raymond W. Sierk, Whitestone, N. Y.

Application June 18, 1954, Serial No. 437,742

14 Claims. (Cl. 99—357)

This invention relates to automatic mechanism for vending packaged food products which must be cooked before vending, to the special package which is vended by the machine, and to the carton in which the food products are packed.

A number of machines have been proposed for heating and dispensing frankfurter sandwiches. Several of these have included means for cooking the frankfurter by impaling it near opposite ends by electrical contact members and utilizing the resistance of the meat to the flow of electrical current to heat the frankfurter. In at least one instance the frankfurter was placed in a split bun and packed in a carton before being put into the vending machine. The packaged frankfurter sandwich was cooked and dispensed while in the package. For many reasons none of the prior devices have proven entirely satisfactory. In most instances the portions of the meat contacted by the electrodes becomes discolored and, therefore, does not present a pleasing appearance to the customers.

The object of the present invention is to provide an automatic dispensing machine which will maintain packaged frankfurter sandwiches under refrigeration until dispensed, cook the meat by resistance cooking while the sandwich is within the refrigerated area of the machine, trim off those portions which are contacted by the electrodes and deliver the cooked and trimmed sandwich to the customer.

Another object of the invention is to provide a special package to contain a frankfurter sandwich having a paper napkin wrapped around it and a capsule of condiment, the package permitting the protrusion of the ends of the frankfurter beyond the ends of the package and having special provision to permit the free passage of knives to sever the protruding ends of the frankfurter, so that the package will have no portions of the sandwich extending beyond the ends of the package when dispensed.

A more specific object of the invention is to provide a dispensing machine in which all portions which contact the meat are easily removed for replacement or for cleaning.

Another object is to provide such a machine in which all operating parts which contact the meat are in the refrigerated area so that particles of meat which may cling to them will not become spoiled and contaminate the meat subsequently contacted.

A still more specific object of the invention is to provide such a machine having novel contacting arms for resistance cooking of the frankfurter and novel mechanism for cutting and ejecting the end portions of the frankfurters.

It is also an object to provide a machine of this nature which is very rugged of construction, easy to operate and in which maintenance has been greatly simplified.

Other objects of the invention will become apparent from the following description of one practical embodiment thereof when taken in conjunction with the drawings which accompany, and form part of, this specification.

In general, the automatic vending machine has provision for storing and refrigerating a supply of packaged frankfurter sandwiches, cooking the frankfurters individually when the mechanism is set into operation, removing the ends of the frankfurter and delivering the cooked and trimmed sandwich. A special package is provided for use with the machine, and the special package and carton are of particular design for cooperation with various elements of the vending machine.

Figure 1:
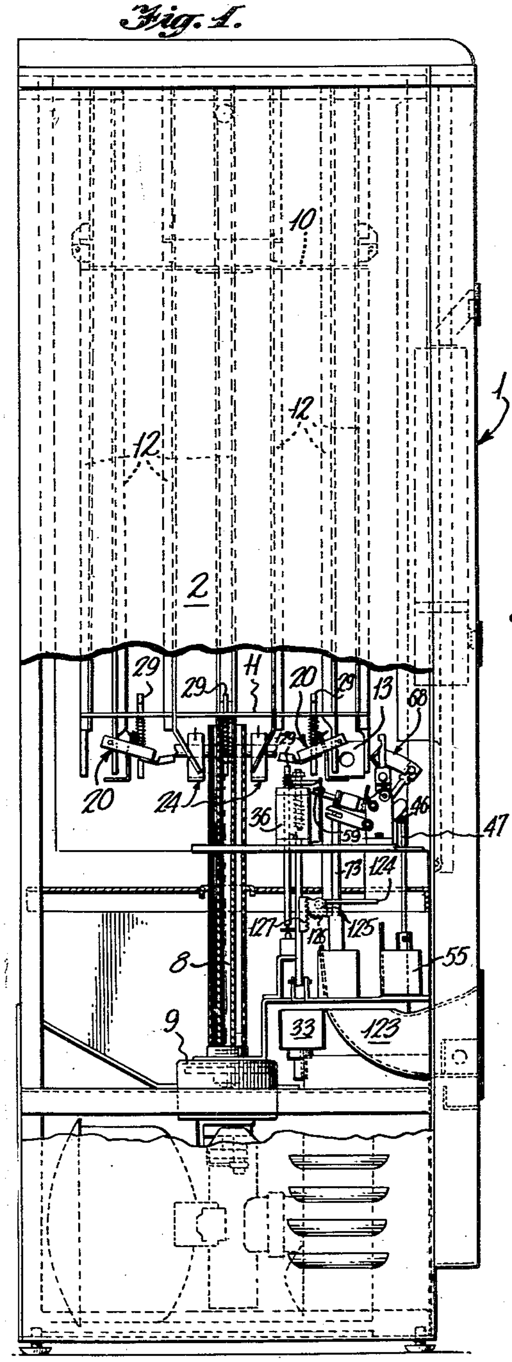
Figure 1 is a side elevation of a vending machine incorporating the principles of the present invention, parts being broken away to show internal mechanism.
Figure 2:
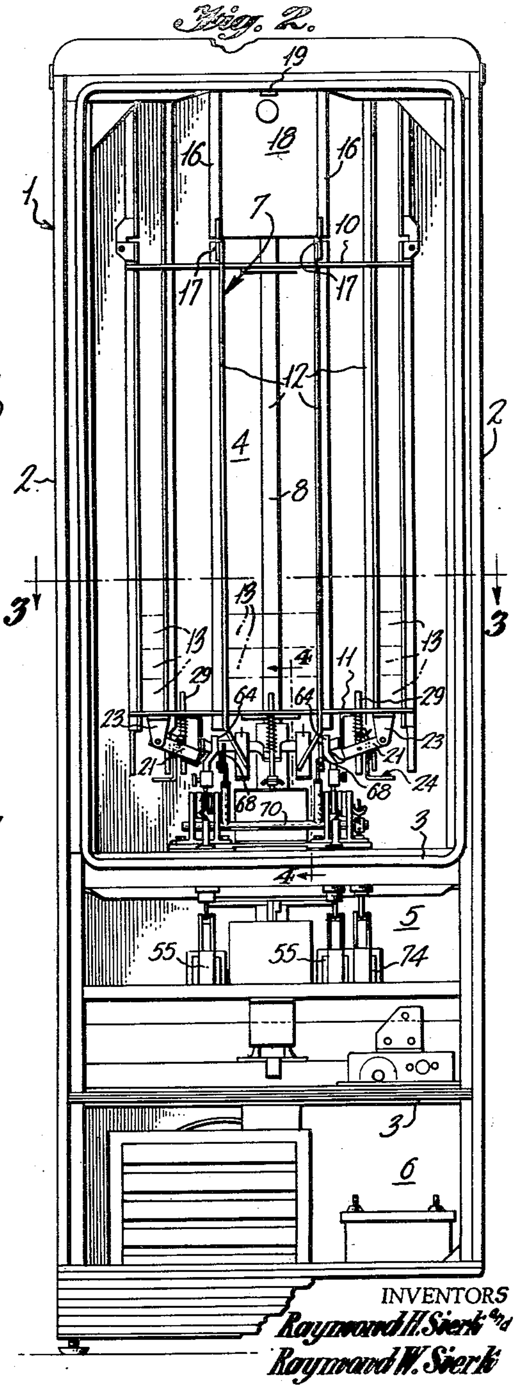
Figure 2 is a front elevation of the machine with the front cover removed.

Referring to the drawings in detail, there is shown in Figures 1 and 2 a vending machine 1, provided with insulated walls and partitions 2 and 3, to divide the interior into a plurality of compartments and to make the box capable of maintaining refrigeration temperatures. The partitions divide the box into an upper chamber 4, which is the package-storage and refrigeration chamber, an intermediate chamber 5, to receive the electrical mechanism for controlling and operating the machine, and a lower chamber 6, for housing refrigeration equipment.

Within the chamber 4 there is a storage magazine 7 which is mounted upon a central vertical shaft 8 and rotatable with the shaft. The shaft is caused to rotate at predetermined times by means of a motor 9. The storage magazine consists of upper and lower support plates 10 and 11 which are rigidly connected to the shaft 8 and support a plurality of guides forming several supply racks. Each of the supply racks consists of four parallel, vertical angle iron members 12. These members are arranged in such fashion that they form the corners of a rectangle when viewed in horizontal cross section, and are adapted to engage the corners of the boxes 13 in which the frankfurter sandwiches are packaged. The angle members will hold the packages in vertical alignment and guide them as they move downwardly. It will be noted that the plates 10 and 11 are cut out in the region of the supply racks so that the boxes may pass freely. Each of the cut outs is substantially rectangular in form, as shown at 14, with arcuate cut out portions 15 extending beyond the ends of the rectangular portion. This particular shape is necessary to permit passage of the special package which will be described in detail. The two front angle members 12 of each of the supply racks are divided near their tops, and the upper sections 16 are joined to the lower section by means of hinges 17. These upper portions are bridged by plates 18 to form doors to permit loading of the respective supply racks. Any suitable fastening means 19 may be provided to hold the doors in closed position.

Figure 6:
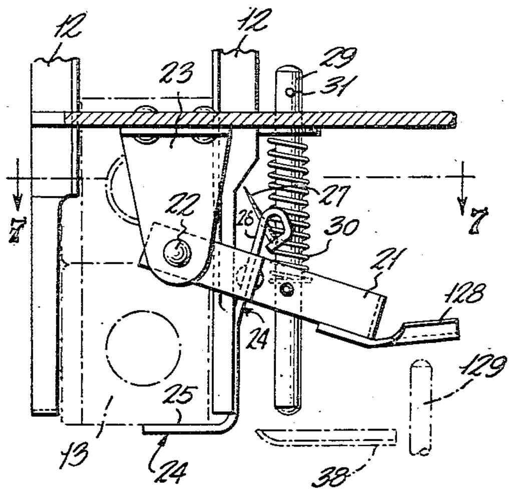
Figure 6 is a fragmentary view showing the package-retaining and releasing mechanism in side elevation.
Figure 8:
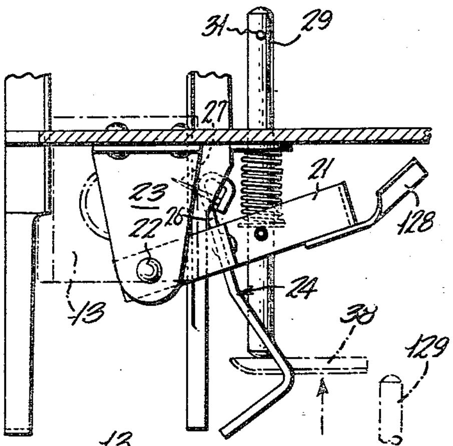
Figure 8 is a view similar to Figure 6 showing the package-retaining mechanism in release position.
Figure 8:
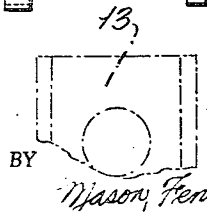
Figure 13:
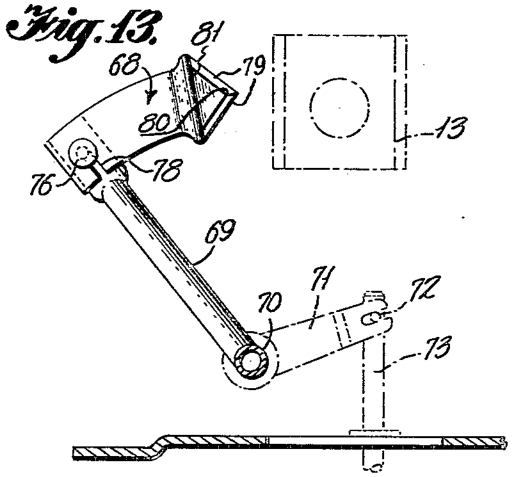
Figure 13 is a detailed view of the severing knife in its "at rest" position.
Figure 15:
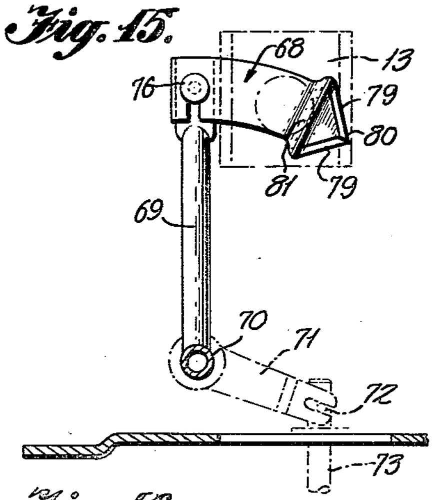
Figure 15 is a view similar to Figure 13 showing the knife in its operative position.
Figure 14:
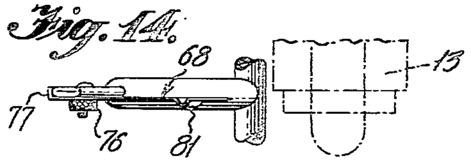
Figure 14 is a top plan view of the knife in the position shown in Figure 13.
Figure 16:
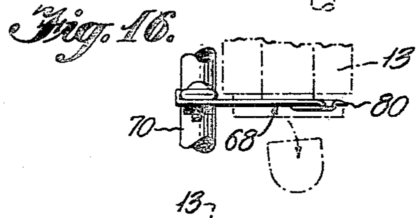
Figure 16 is a plan view of the knife in the position shown in Figure 15.

At the bottom of each supply rack, there is a package-holding and release mechanism 20. As all of the release mechanisms are identical, only one will be described. Each package release mechanism comprises a yoke 21 which is pivoted at its ends, as at 22, to brackets 23 which are secured to, and depend from, the lower storage magazine plate 11. The brackets are spaced apart a sufficient distance to bridge the storage rack. The yoke carries a pair of spaced package-supporting fingers 24. These fingers have upstanding portions connected to the laterally projecting arms of the yoke, and horizontal lip portions 25 adapted to underlie, and support, the bottom package in the rack. Upward movement of the yoke about its pivots will cause the supporting fingers to move from beneath the package, as shown in Figure 6, to a position beyond the rear edge of the rack to allow the package to drop freely from the rack, as shown in Figure 8. Each of the supporting fingers has an upward extension 26 which carries an impaling pin 27. When the yoke is moved upward to move the fingers from beneath the bottom box, the impaling pins will enter the box immediately above the bottom one to hold that box, and those above it, in position while the bottom box is being discharged. When the yoke moves back to its initial position, the pins release the box which they had impaled, permitting it to drop. The supporting lips of the fingers will be in position by this time to catch the box and so retain it in the rack. Yoke 21 is bent to form a central operating arm 28. This arm is pivotally connected to a control rod 29 which has its end passing through an opening in the bottom support plate 11. A spring 30 surrounds the upper portion of the rod between its connection to the arm 28 of the yoke and the bottom of the support plate 11. The spring will normally hold the yoke in its lower position, supporting the boxes in the rack. A limit pin 31 is carried near the upper end of the control rod so that the rod will not come out of the opening in the support plate when there are no boxes in the rack.

As mentioned above, a package-supporting and release mechanism, such as just described, is mounted at the bottom of each of the supply racks. There is but one means for operating these devices, and it is positioned so as to be operable upon the release mechanism of the rack which is located above the discharge chute of the machine.

The operating mechanism consists of a rod 32 which is vertically positioned and passes through the partition between the upper and central chambers 4 and 5. Rod 32 is raised at appropriate times by means of a solenoid 33 mounted in the chamber 5. The upper part of the rod passes through a bracket 36 and a spring surrounds the upper part of the rod and bears against the underside of the bracket 36. A pin and washer are used to support the lower end of the spring 37. A toe member 38 is fixed to the top of control rod 32 and extends outwardly from the rod to underlie the control rod 29 of the package-supporting and release mechanism which is in position to dispense packages. When the solenoid 33 is energized, control rod 32 will be lifted, causing the toe member to contact, and lift, control rod 29, thereby operating the release mechanism to permit a package to fall from the rack. When the solenoid is deenergized, spring 37 will return control rod 32 to its inoperative position and spring 30 will return the release mechanism to package-supporting position.

While the bottom package in the rack is being supported upon the fingers 24, the frankfurter within that package is being cooked and the ends are trimmed off. As previously mentioned, the frankfurter is cooked by means of an electric current being passed through the meat. Means are provided to grip the opposite ends of the frankfurter, with one of the arms of each set of gripping members being provided with means for penetrating the meat to establish good electrical contact and prevent arcing. This mechanism comprises spaced pairs of lever arms carrying the gripper members, with the pairs being positioned so that upon actuation the opposite ends of the frankfurter will be gripped between the pairs of arms. Each pair comprises a lower lever arm 39 mounted upon a shaft 40 and an upper lever arm 41 mounted upon a shaft 42. The arms of each pair are mounted in the same vertical plane and shafts 40 and 41 carry gears 43 and 44 respectively. The gears are in mesh so that when rotation is imparted to one shaft, the other will rotate in a reverse direction and the respective arms of the pairs will be caused to move toward and away from one another. The lower lever arm 39 is provided with an extension to form an operating arm 45. This arm is pivotally connected to one end of a link 46, and the opposite end of the link is pivotally attached to a connecting rod 47. Rod 47 is slidably mounted within a cap 48 carried by the end of a pull rod 49. The pull rod is slidable within bearings 50 fixed in opposite ends of a tube 51 secured to the partition between the chambers 4 and 5. The pull rod is provided with a collar 52 and a spring 53 surrounds the pull rod and has its opposite ends bearing against the lower bearing 50 and the collar 52 to exert an upward force upon the rod. The lower end of the pull rod is internally threaded and receives the threaded end of a link 54 which is connected to an operating solenoid 55. The tension of the spring and the movement of the rod can be adjusted by disconnecting the link 54 from the solenoid and turning it in the pull rod so as to change the effective length of the rod and link. In order to provide required flexibility in the operation of the clamping members, the connecting rod 47 has a spring 56 surrounding it and the spring bears against the cap 48 and a nut 57 threaded on the lower end of the connecting rod. Thus, the levers may have cushioned movement independently of movement of the pull rod 49.

The lower levers 39 have sockets 58 in their ends to receive contact arms 59. Set screws 60 hold arms 59 within the sockets of the levers 39. Near the outer end of the contact arms 59 the inner surface is provided with a concavity 61 to form a contacting and gripping face for engaging the frankfurter. These contact arms are also provided with contact elements 62 which have sharpened edges so they will cut into the meat of the frankfurter when the clamping arms are brought together. It will be noted from Figure 12 that these contact elements are set at an angle and, therefore, will exert a pressure against the meat and compact it, insuring solid electrical contact between the contact elements and the meat. Arm 59 is provided with a surrounding flange 63 which serves as a drip guard to deflect any juices which may run down the arm and direct them to a suitable disposal. The upper lever arms 41 carry contact and gripping arms 64. These arms are identical with the arms 59, except that they do not carry contact elements and they are not provided with a drip guard. Arms 64 seat in recesses 65 in the levers 41 and are held in place by means of set screws 66. Electrical current is brought into the arms by means of a terminal 67 mounted on the arm 39. Shafts 40 and 42 are suitably insulated so that the electrical current will be confined to the arms and not pass through the other parts of the machine.

It will be obvious that when solenoid 55 is actuated the arms will be caused to move toward one another and the contact elements 62 will penetrate the ends of the frankfurter while the frankfurter is being held tightly between the concave gripping faces of the contact arms. By reason of the flexibility provided in the pull rod through the use of the spring 56 on the connecting rod, the arms can move apart as the frankfurter increases in size while cooking. This will enable the grippers to hold the frankfurter with a fairly constant gripping force, regardless of expansion.

The contact arms 59 and 64 may be quickly removed for cleaning or replacement simply by loosening the set screws 60 and 66 and withdrawing the arms from the recesses in the lever arms. Thus, it is possible for a maintenance man to replace the gripping arms periodically, so that those which have been in use may be cleaned and sterilized.

Figures 10, 11, 12:
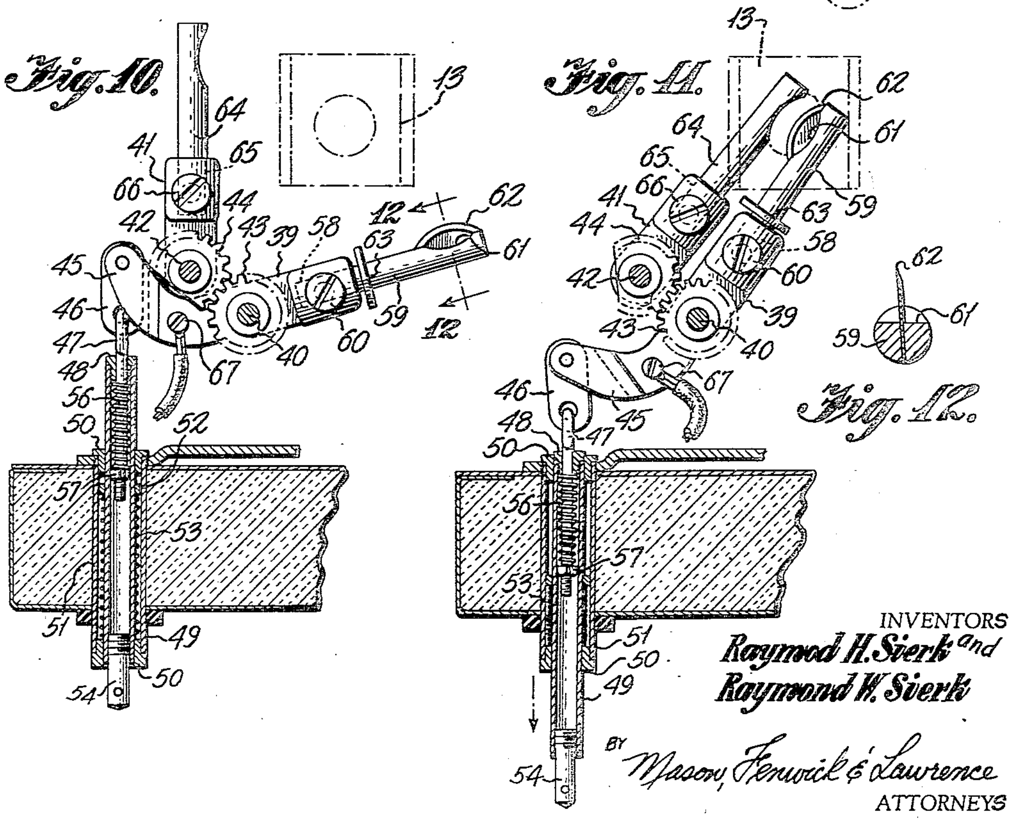
Figure 10 is a detailed view in vertical section showing the clamping and contact arms in their "at rest" position.
Figure 11 is a view similar to Figure 10 showing the arms moved to their operative position.
Figure 12 is a section taken on the line 12—12 of Figure 10.

After the frankfurter has been cooked, solenoid 55 is deenergized and the arms moved apart to assume the position shown in Figure 10. It is to be noted that the ends of the frankfurter extend beyond the ends of the special package so that they may be readily gripped by the contact arms without puncturing or defacing the package in any way. It frequently happens in resistance cooking that the meat in the immediate area of the contacts becomes discolored. This portion of the meat appears unappetizing and, therefore, provision is made to sever the ends of the frankfurter prior to releasing the package to the customer. The cutting operation not only removes the discolored areas but also reduces the length of the frankfurter so that it is shorter than the package and there will be no opportunity for the meat to come into contact with parts of the machine as it is being dispensed.

Cutting blades 68 are provided to remove the frankfurter ends. The blades are mounted for reciprocating motion, and positioned to pass through specially provided passageways at the ends of the carton enclosing the sandwich, which carton will be later described in detail. The knives 68 are mounted on the ends of arms 69 which are fixed to a shaft 70. An actuating arm 71 is connected to the shaft 70 and has its end bifurcated to engage a pin 72 projecting from a vertical control rod 73. Rod 73 is connected to a solenoid 74. When the solenoid is energized it will draw down the rod 73, causing the shaft 70 to rotate and move the knife through the passageway in the carton to sever the end of the frankfurter. When the solenoid is denergized, spring 75 surrounding rod 73 will lift the rod and move the knife to its inoperative position. The ends of arms 69 are flattened and set screws 76 are threaded in them. The knife element is a flat member having a flange 77 at its rear end at a right angle to the plane of the knife to engage one edge of the flattened area of the arms 69. The knives have slots 78 to slip over the shanks of the set screws 76 to make the knives readily removable. The forward ends of the knives are pointed, and they are provided with rearwardly diverging cutting edges 79, which edges meet at the point 80. By having this construction, the point will penetrate the skin of the frankfurter and the edges will then cut through easily. Just behind the cutting edges the knives are bent to form a curved ejecting rib 81. As the crown of the rib is offset some distance with respect to the plane of the knives, the rib will serve to force the cut off ends of the frankfurters out through the openings at the ends of the box to assure the cut off portions being entirely removed from the package. The particular mounting employed for the knives makes it possible to remove the knives very quickly for cleaning or replacement.

Figures 3, 17:
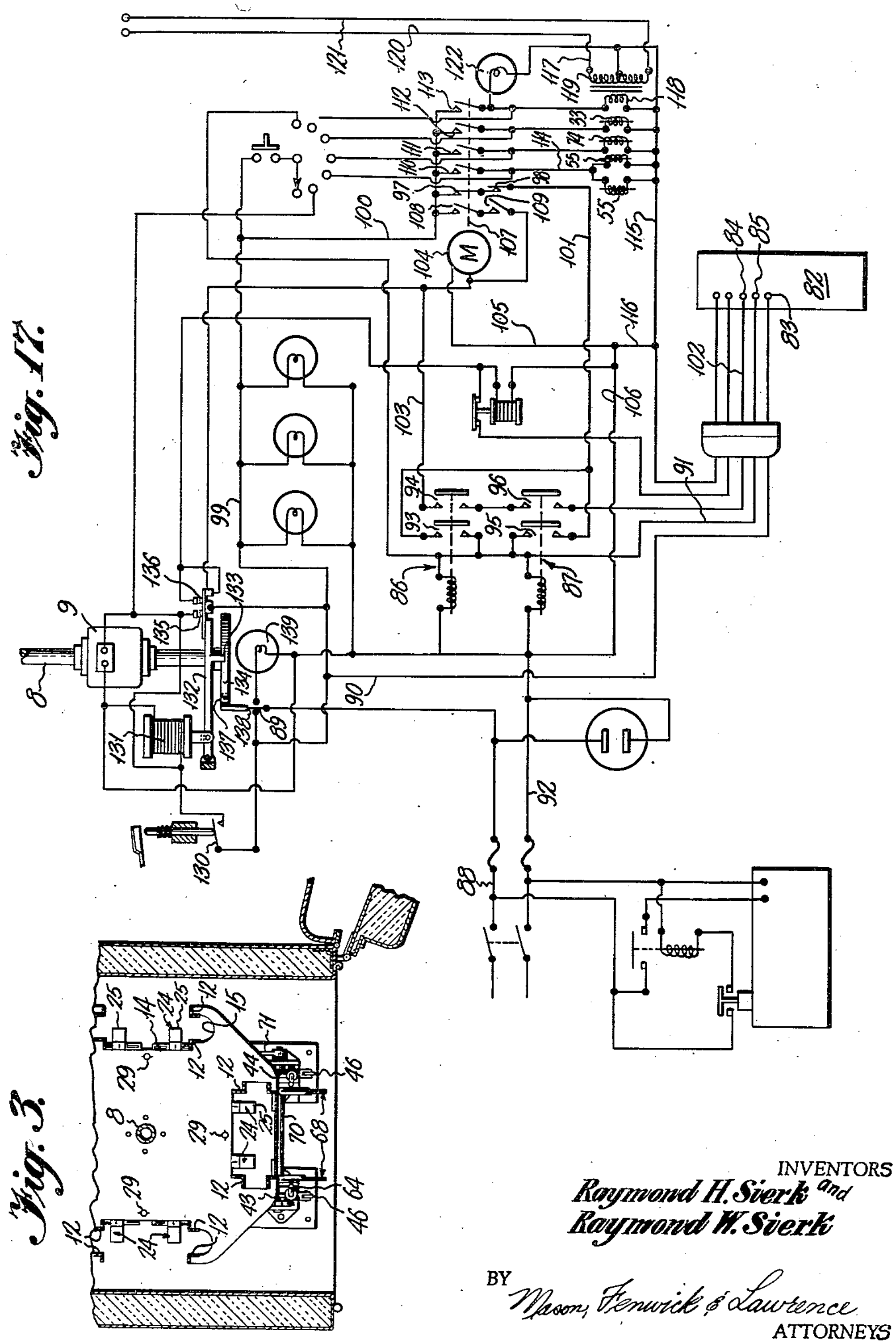
Figure 3 is a horizontal section through the package magazine, and is taken on the line 3—3 of Figure 2.
Figure 17 is a diagrammatic view of the control circuit for the machine.
Figure 4:
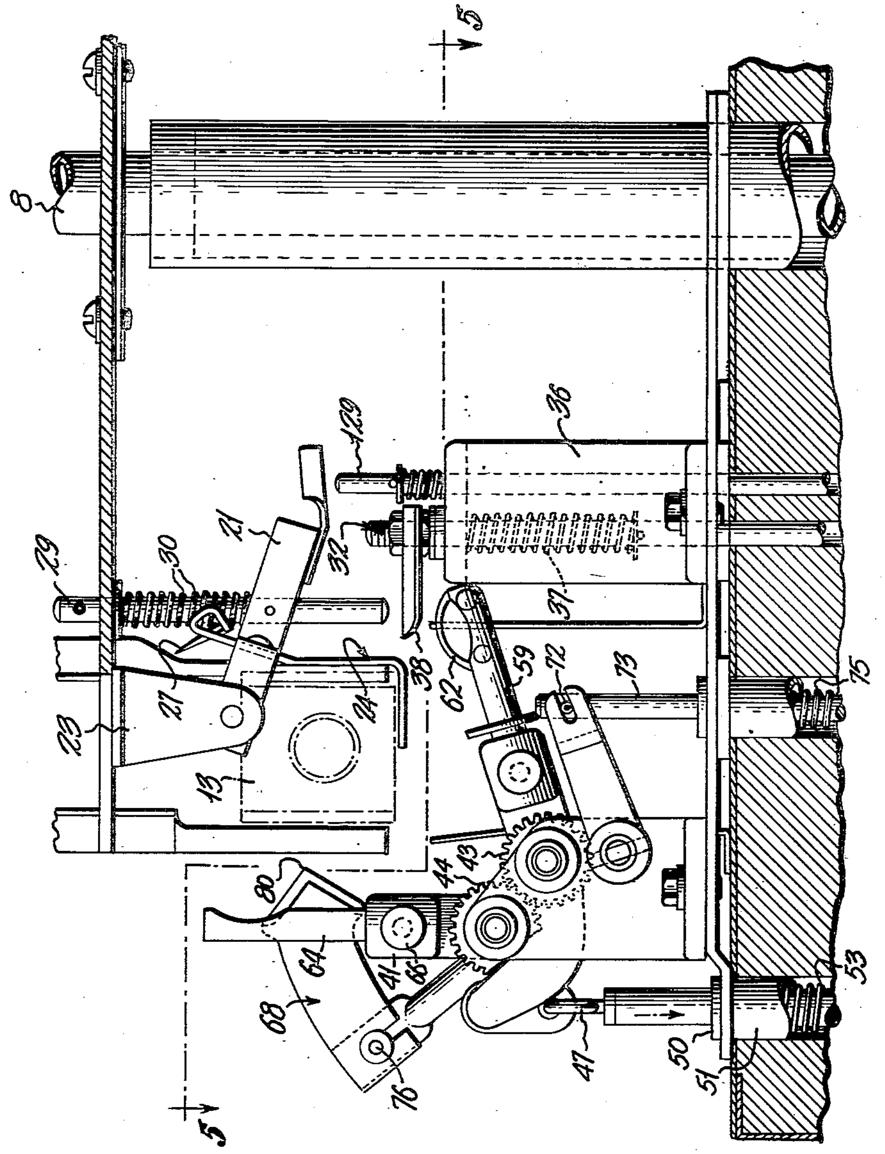
Figure 4 is a partial vertical section taken on the line 4—4 of Figure 2, illustrating portions of the clamping and contact arms and the end-severing knife.
Figure 5:
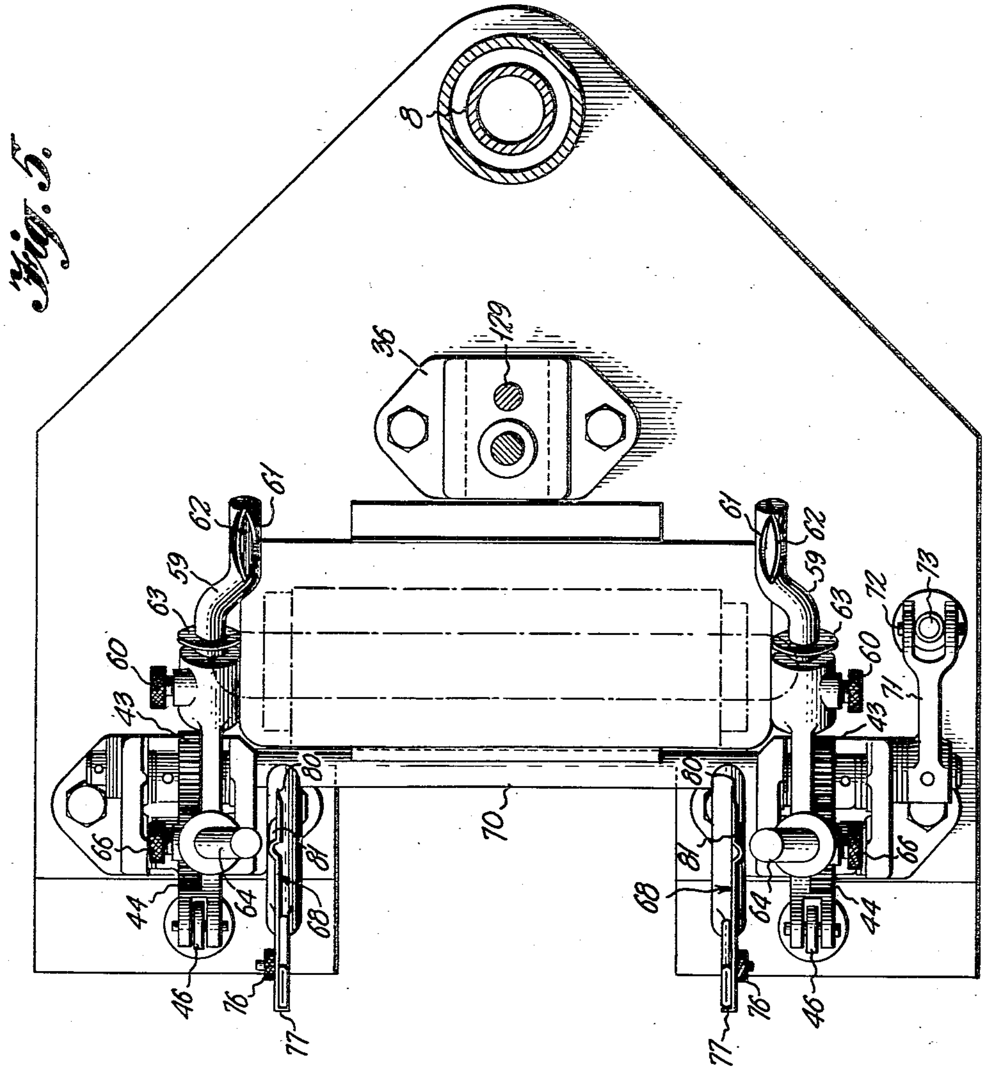
Figure 5 is a horizontal section taken on the line 5—5 of Figure 4 illustrating the knife and clamping arm mechanisms in plan.
Figure 7:
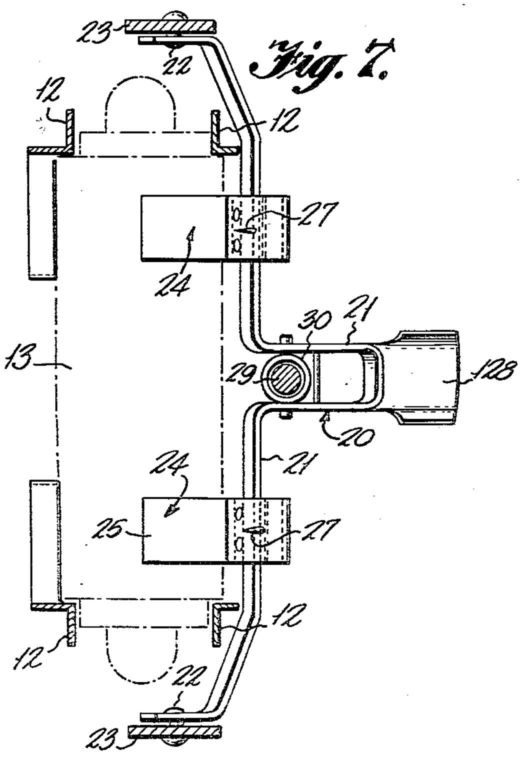
Figure 7 is a horizontal section taken on the line 7—7 of Figure 6.

The operation of the various solenoids which cause the several mechanisms to perform their respective tasks is controlled by electrical means set in operation when a coin is deposited in the machine. The coin control mechanism institutes the cycle, and the order and duration of operation of the respective mechanisms is determined by a control device. The electrical circuit incorporating these various elements is shown in Figure 17. The positions of the various switches shown are those which they occupy when the machine is standing idle, before a coin has been inserted.

In this circuit, a coin control mechanism 82 is shown. This may be any standard coin control having a plurality of terminal posts for connection of the machine circuits, and means operable upon the insertion of a coin to momentarily close certain of these circuits to institute operation of the machine. A coin control such as that manufactured by National Rejectors, Inc. will be suitable for the purpose. Under normal conditions terminals 83 and 84 are connected by a switch. When a coin is inserted the power is momentarily transferred from terminal 83 to terminal 85. This energizes a master relay 86 and an anti-jackpot relay 87. The relay circuit includes wires 88, empty switch 89, wire 90 to terminal 83, and from terminal 85 through wire 91 to the relay coils and the return line 92. When the relays are energized switches 93 and 94 of the master relay and switches 95 and 96 of the anti-jackpot relay are closed. The closing of switches 93 and 95 complete holding circuits for the relays through switches 97 and 98. Switches 97 and 98 are in circuits which include power line 88, wires 99, 100, 101, the switches 93 and 95, the coils of the relays 86 and 87 and the return line 92. As soon as the momentary contact between terminals 83 and 85 has been broken, the coin control switch returns to its normal position connecting terminals 83 and 84. Terminal 84 is connected by a wire 102 to switches 94 and 96 of the relays, and these in turn are connected by wire 103 to a control drum motor 104. The motor is connected to the return line 92 through wires 105 and 106. The motor begins rotating a switch-actuating cam shaft 107 which controls switches 108, 109, 97 and 98, 110, 111, 112 and 113. As soon as the motor begins to operate, switches 108 and 109 are closed. These switches are in a circuit which bridges wires 100 and 103 so that a circuit is established for the motor and it is no longer necessary to supply power through switches 97 and 98. These switches then open and relays 86 and 87 are deenergized. Switch 110 then closes, and solenoids 55 controlling the operation of the gripping lever arms 39 and 41 are energized. The solenoid circuit includes the switch 110, which is connected into the line 100, the wires 114, 115, 116, 106 and the return line 92. As soon as the clamping arms are closed upon the frankfurter ends, switch 113 closes to energize the cooking transformer 117. The primary coil 118 of this transformer is connected through the switch 113 across the lines 100 and 115. The secondary coil 119 is connected by wires 120 and 121 to the terminals on the lever arms of the gripping or clamping elements. A cooking lamp 122 is bridged across the transformer so that there may be visual indication that the cooking is taking place. While switch 113 is closed, the motor cam shaft operates to reset switches 97 and 98 to their normally closed position. Switch 113 then opens to stop the cooking operation and switch 110 opens, deenergizing solenoids 55 to remove the clamping arms from the frankfurter ends. Switch 111 is then closed, energizing solenoid 74 to actuate the knives to cut off and eject the ends of the frankfurter. The switch 111 then opens opens and the knives return to their position of rest. Upon further rotation of the cam shaft switch 112 closes and solenoid 33 is energized, operating the package release mechanism to permit the package containing the cooked frankfurter to fall from the rack into the delivery chute. Switches 108 and 109 then open, stopping the operation of the control motor 104 and completing the vending cycle.

When the package release mechanism is operated, a door in the bottom of the refrigeration compartment 4 is opened to permit the package to drop out of the refrigeration compartment and into the delivery chute 123. Door 124 is hingedly connected to the partition between the refrigeration and control chambers, and its pivot 125 carries a gear segment 126 which is in mesh with a rack 127 carried by the release mechanism control rod 32. Thus, when the control rod is operated to release the package, the door will be open so the package may fall through into the discharge chute. When the solenoid is deenergized and the control rod returns to its normal position, the door will return to its closed position.

Figure 9:
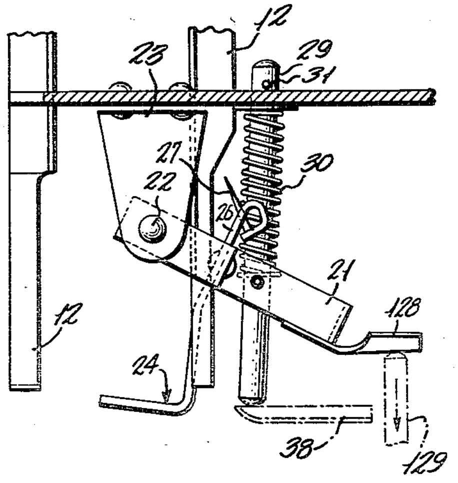
Figure 9 is also a view similar to Figure 6 showing the position of the package-retaining mechanism when all packages have been removed from a stack.

When any particular storage rack becomes empty, the package-supporting fingers 24 will over-travel their normal position on the return stroke to assume the position shown in Figure 9. Yoke 21 carries a depressor 128 which contacts a plunger 129 which, in turn, actuates a rack-empty switch 130. Closing the switch applies power to a solenoid 131, and magazine rotating motor 9 simultaneously. Energizing solenoid 131 will lift a pawl 132 from an indent 133 in an indent plate 134 connected to, and rotatable with, the supply magazine shaft 8. As soon as the pawl is lifted, shaft 8 and the supply magazine will begin to rotate under the influence of motor 9. The pawl in litfing actuates switches 135 and 136. Switch 135 is bridged across lines 99 and 92 so that when it is closed it supplies power to the motor 9. As soon as the indent plate 134 has moved a few degrees, the depressor 128, carried by yoke 21, has moved away from the plunger 129 and the plunger will lift, opening switch 130 and deenergizing solenoid 131. As the pawl is now riding upon the high portion of the indent plate, switches 135 and 136 will remain actuated and the magazine will continue to rotate. The magazine rotates until the next supply rack is located in delivery position at which time the pawl falls into the next indent in the plate 134, stopping the rotation of the magazine and permitting switches 135 and 136 to return to their normal positions. The indent plate carries a cam 137 which will trip the empty switch 138 when the supply magazine has made a revolution and all of the supply racks are empty. As switch 138 is in the main supply line, power will be removed from all circuits when this switch is thrown. Switch 138 is preferably a toggle switch and when opened must be manually reset. An empty lamp 139 is connected to the switch 138 and return line 92 so that when the switch is thrown the lamp will light to indicate that the machine is empty.

It will be noted from Figure 17 that various other circuits are included, but these relate to safety factors and interlocks between the vending machine circuits and the coin control and will not be described in detail.

Figure 23:
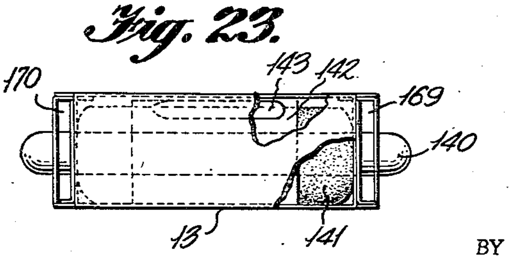
Figure 23 is a side elevation of the package with the sandwich, napkin and condiment container in place.

Referring now to the special package used with the machine, it will be noted from Figure 23 that a frankfurter 140 is positioned within a split bun 141, and that the frankfurter is longer than the bun and extends beyond either end of the bun. A carton 13 is provided to house the bun and to support the projecting ends of the frankfurter. Before the sandwich is inserted in the carton it is wrapped with a paper napkin 142, and a capsule 143 containing condiment is slipped into the carton with the napkin-wrapped sandwich.

Figure 18:
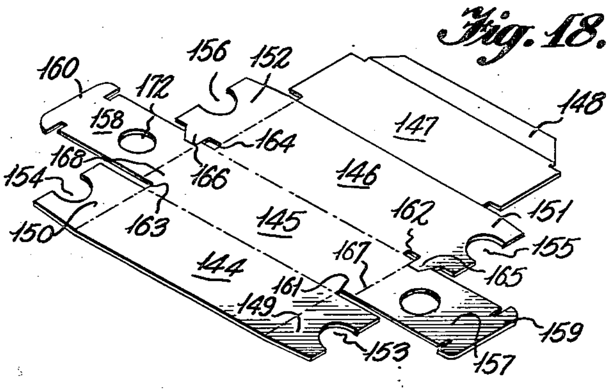
Figure 18 is a perspective view of the blank used for constructing the carton for packaging the sandwich.
Figures 19, 20:
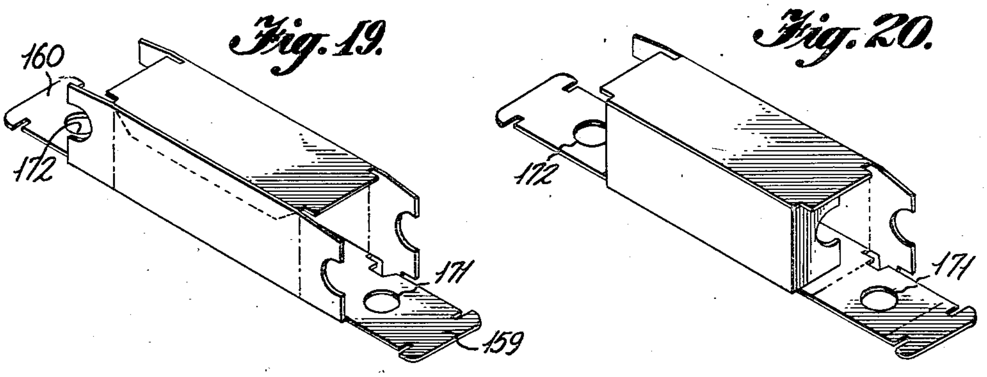
Figure 19 is a perspective view of the carton as set up preparatory to receiving the sandwich.
Figure 20 is a view similar to Figure 19 showing the end flaps of the carton partially folded in place.
Figure 21:
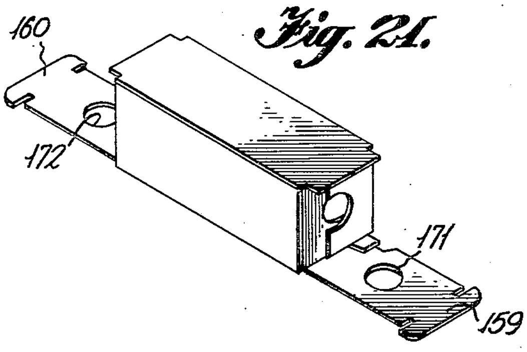
Figure 21 is another perspective view showing the end closure flaps completely folded.
Figure 22:
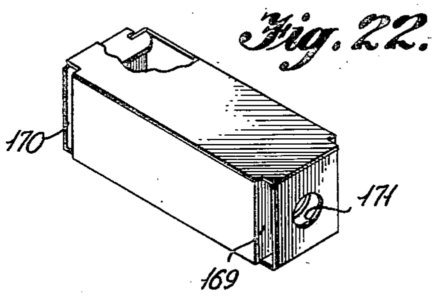
Figure 22 is a perspective view of the completely folded box.

The carton 13 is made from a blank such as is shown in Figure 18, which is folded up to form the completed carton. The blank consists of four body panels 144, 145, 146 and 147, each of which is substantially rectilinear and joined to its adjacent panel along a score line. The end panel 147 has a glue flap 148 which, when the four panels are folded into position, will be glued to the underside of the end panel 144. Attached to opposite ends of the body panels 144 and 146 are the end closure flaps 149, 150, 151, and 152. These closure flaps are slightly longer than half the width of the box when folded up, so that they will overlap one another. The flaps are provided with arcuate notches in their ends, as shown at 153, 154, 155, and 156. The two flaps at each end of the blank when folded in position will overlap as mentioned, and the arcuate notches will form a circular opening to surround the end of the frankfurter. End flaps 157 and 158 are connected to the ends of the body panel 145 and each of these end panels carries a locking flap 159 and 160.

It will be noted that body panels 145 and 147 are somewhat longer than the body panels 144 and 146 and that the longer panels are notched at each corner as at 161, 162, 163 and 164, with the edges of the notches being in alignment with the ends of the shorter body panels. By reason of this construction the end flaps 157 and 158 will be spaced from the end closure flaps 149, 150, 151 and 152 when the box is completely folded up and the box will have notched corners for a purpose to be described.

Due to the spacing of the end closure flaps from the end flaps, it is necessary to provide means for holding the end closure flaps in closed position. For this purpose the end closure flaps 151 and 152 are provided with spacing tabs 165 and 166 extending from their side edges and adapted to be folded at right angles to the end closure flaps and lie upon the surface of the body panel 145. This will cause their outer edges to contact the end flaps 157 and 158 and rigidly hold the end closure flaps in place. It will, of course, be evident that the end closure flaps 149 and 150 are folded in position first, and then the closure flaps 151 and 152 are folded upon them. In this way the spacing tabs will hold the end closure flaps 151 and 152 in place, and these end closure flaps, in turn, will hold the end closure flaps 149 and 150 in proper closed position. The extensions 167 and 168 created by notching the body panel serve to rigidify the structure and prevent external pressure against the carton from forcing the end flaps 157 and 158 inwardly out of their normal parallel relation with the end closure flaps and properly maintain the passageways 169 and 170 between the end closure flaps and the end flaps. The end flaps are provided with circular openings 171 and 172 which will be in alignment with the circular openings formed by the notches of the overlapped end closure flaps. The projecting ends of the frankfurter will extend through these aligned openings, with portions projecting beyond the end flaps to be engaged by the gripping contact members of the machine, and the portions intermediate the aligned openings will be rigidly supported so that they can be easily cut by the knives 68 when they pass through the passageways 169 and 170.

The notched corners of the carton will form guides to engage the vertical angle iron members 12 which form the supply racks, so that the packages will slide vertically in the racks with rather close tolerance and there will be no pressure exerted against the ends of the carton. This construction permits an ease of operation not possible with a supply rack which contacts the ends of a box. When the end flaps of a box are folded they will invariably bow outward slightly and tend to frictionally engage guides with which they are in contact. With the present structure there is no end contact and the notches will be die cut so that extreme accuracy may be obtained. It will be evident that through the use of this special package the ends of the frankfurter may project beyond the ends of the box for ease in gripping by the electrodes, and that the projecting ends may be cut off before delivery so that when the customer gets the package none of the product will be projecting beyond the confines of the carton.

While in the above one practical embodiment of the invention has been disclosed, it will be understood that the specific details of construction described and shown are merely by way of illustration and that the invention is to be limited only by the scope of the appended claims.

What is claimed is:

1. In a frankfurter sandwich vending machine, a cabinet including refrigeration, control and refrigeration equipment chambers, a supply magazine in said refrigeration chamber, means operable to contact and grip the ends of a frankfurter in said supply magazine, said means being connected to a source of electric power to cook said frankfurter through the resistance of the frankfurter to the passage of electricity, means to sever the ends of said frankfurter contacted by said contacting and gripping means, means to release the cooked and trimmed frankfurter sandwich from the supply magazine, and means to control the sequence and duration of operation of said gripping means, said severing means and said release means.

2. In a frankfurter sandwich vending machine as claimed in claim 1, said supply magazine comprising a plurality of supply racks and being rotatable, and means operable by said release means when a supply rack is empty to rotate said magazine to bring another supply rack into delivery position.

3. In a frankfurter sandwich vending machine as claimed in claim 2, means to prevent further operation of the machine when all supply racks are empty.

4. In a frankfurter sandwich vending machine, a cabinet including refrigeration, control and refrigeration equipment chambers, a supply magazine in said refrigeration chamber rotatably mounted and including a plurality of supply racks, movable sandwich supporting means at the base of each supply rack, a discharge chute, means adjacent said discharge chute to move the sandwich supporting means of the rack positioned above said discharge chute to release a sandwich from the rack, means operable to contact and grip the ends of a frankfurter in the rack above said discharge chute, said contacting and gripping means being connected to a source of electric power to cook said frankfurter through the resistance of the frankfurter to the passage of electricity, means to sever the ends of said frankfurter contacted by said contacting and gripping means, and means to control the sequence and duration of operation of said gripping means, said severing means, and said means to move said sandwich supporting means.

5. In a frankfurter sandwich vending machine as claimed in claim 4, means operable by the sandwich supporting means of the rack above said discharge chute when said rack is empty to rotate said supply magazine to bring another supply rack above said discharge chute.

6. In a frankfurter sandwich vending machine as claimed in claim 1, said contacting and gripping means comprising spaced pairs of lever arms mounted to grip opposite ends of a frankfurter in said rack, matching levers of each pair being mounted upon common shafts, means intercoupling said shafts for simultaneous and opposite rocking movement and means to rock one of said shafts.

7. In a frankfurter sandwich vending machine as claimed in claim 6, said levers having removable gripper elements, one of said elements of each pair having a contact for penetrating said frankfurter arranged at an angle to the plane of movement of said levers.

8. In a frankfurter sandwich vending machine as claimed in claim 1, said contacting and gripping means comprising spaced pairs of lever arms mounted to grip opposite ends of a frankfurter in said rack, matching levers of each pair being mounted on common shafts, means intercoupling said shafts for simultaneous and opposite rocking movement, and means including yieldable connecting means to rock one of said shafts.

9. In a frankfurter sandwich vending machine as claimed in claim 8, said lever having removable gripper elements, one of said elements of each pair having a contact for penetrating said frankfurter arranged at an angle to the plane of movement of said levers.

10. In a frankfurter sandwich vending machine as claimed in claim 1, said means to sever the ends of the frankfurter comprising, spaced lever arms mounted upon a shaft, knives carried by said levers, and means to rock said shaft.

11. In a frankfurter sandwich vending machine as claimed in claim 1, said means to sever the ends of the frankfurters comprising, spaced lever arms mounted upon a shaft, knives removably connected to said levers, and means to rock said shaft.

12. In a frankfurter sandwich vending machine as claimed in claim 11, said knives having cutting edges arranged at an angle to one another and meeting in a point.

13. In a frankfurter sandwich vending machine as claimed in claim 1, said contacting and gripping means comprising spaced pairs of levers mounted to grip opposite ends of a frankfurter in said rack, matching levers of each pair being mounted upon common shafts, means intercoupling said shafts for simultaneous and opposite rocking movement, and means to rock one of said shafts, said means to sever the ends of the frankfurter comprising spaced lever arms mounted upon a shaft, knives carried by said levers, and means to rock said shaft.

14. In a frankfurter sandwich vending machine as claimed in claim 13, said gripping lever arms having removable gripper elements, and said knives being removably mounted upon the lever arms of the severing means.

References Cited in the file of this patent

UNITED STATES PATENTS

| | | |
|---|---|---|
| 1,543,650 | Lyons | June 23, 1925 |
| 2,256,976 | Ford | Sept. 23, 1941 |
| 2,287,956 | Aff | June 30, 1942 |
| 2,390,277 | Simpkins | Dec. 4, 1945 |
| 2,531,238 | Tandler et al. | Nov. 21, 1950 |
| 2,609,301 | Lindsey | Sept. 2, 1952 |
| 2,646,357 | Seiferth | July 21, 1953 |